(No Model.)  3 Sheets—Sheet 1.

J. P. TOLMAN.
MACHINE FOR MAKING CORDAGE.

No. 326,607.  Patented Sept. 22, 1885.

WITNESSES
W. J. Cambridge
James O. Libby

INVENTOR
James P. Tolman
By R. C. Teschemacher
Atty.

N. PETERS, Photo-Lithographer, Washington, D. C.

(No Model.)  3 Sheets—Sheet 2.

J. P. TOLMAN.
MACHINE FOR MAKING CORDAGE.

No. 326,607. Patented Sept. 22, 1885.

WITNESSES
W. J. Cambridge
James O. Libby

INVENTOR
James P. Tolman
By P. E. Teschemacher
Atty (No Model.) 3 Sheets—Sheet 3.
J. P. TOLMAN.
MACHINE FOR MAKING CORDAGE.
No. 326,607. Patented Sept. 22, 1885.
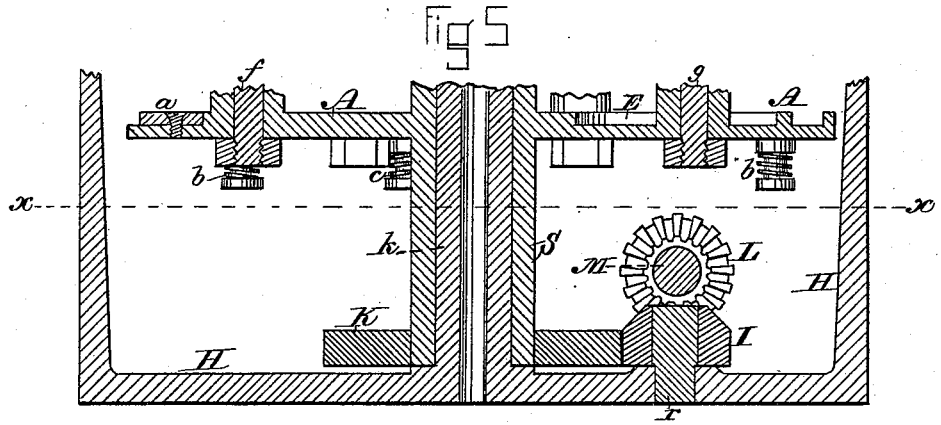
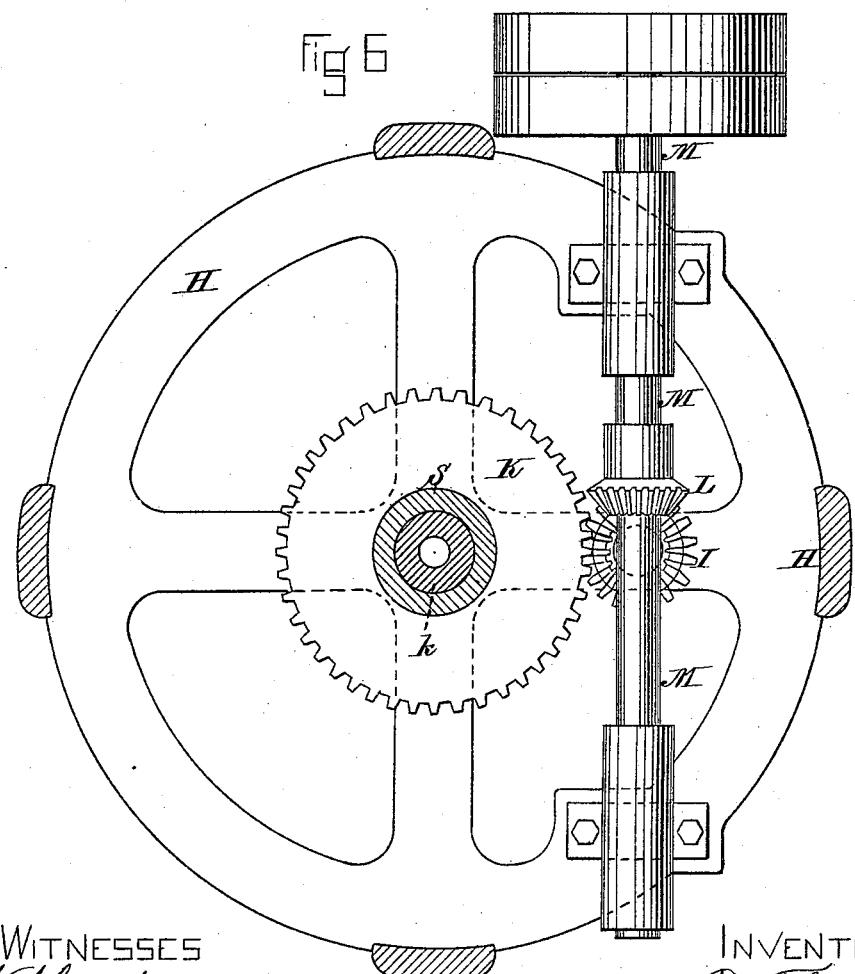
WITNESSES
INVENTOR

UNITED STATES PATENT OFFICE.

JAMES P. TOLMAN, OF WEST NEWTON, MASSACHUSETTS.

MACHINE FOR MAKING CORDAGE.

SPECIFICATION forming part of Letters Patent No. 326,607, dated September 22, 1885.

Application filed December 1, 1884. (No model.)

*To all whom it may concern:*

Be it known that I, JAMES P. TOLMAN, a citizen of the United States, residing at West Newton, in the county of Middlesex and State of Massachusetts, have invented certain new and useful Improvements in Machines for Making Cordage, of which the following is a full, clear, and exact description, reference being had to the accompanying drawings, making part of this specification, in which—

Figure 1:
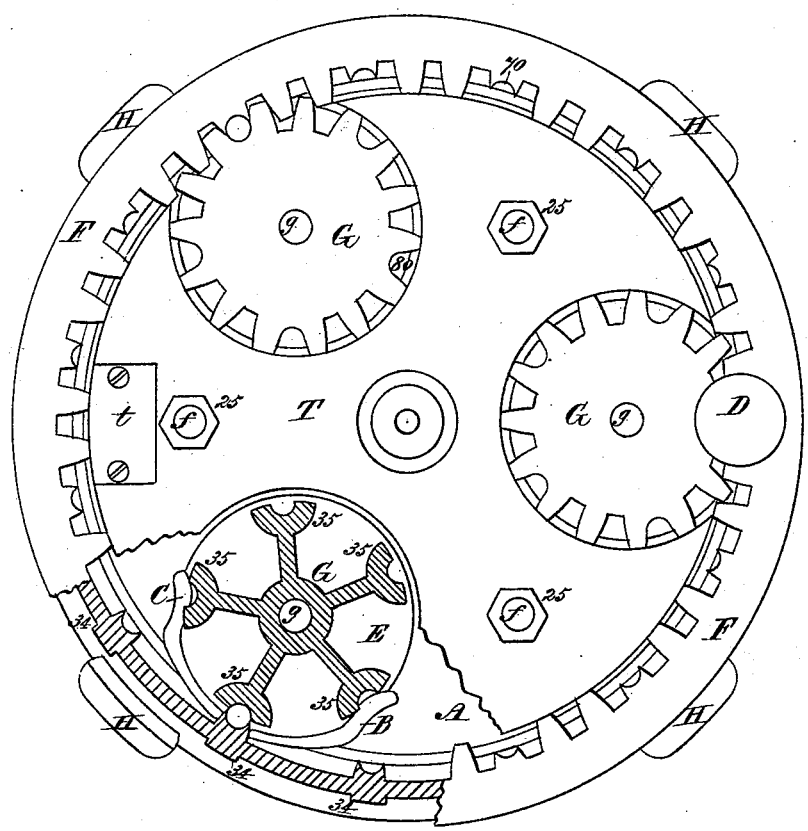
Figure 2:
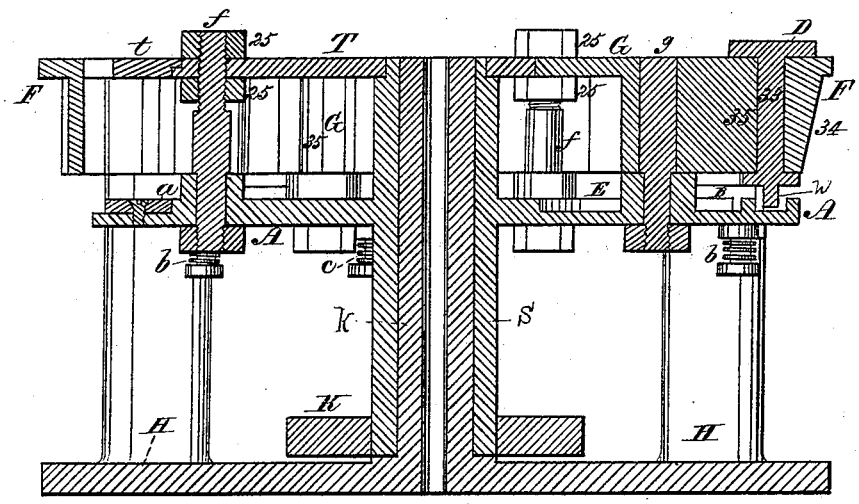
Figure 4:
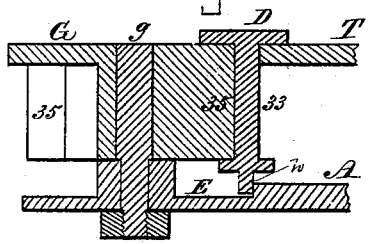
Figure 3:
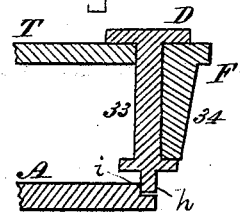

Figure 1 is a plan of my improved machine with a portion of the supporting-plate removed, and with one of the carrier-gears and a part of the toothed guide-ring shown in horizontal section. Fig. 2 is a vertical section through the center of the same. Fig. 3 is a vertical section of a part of the machine, showing a traveler when in a different position from the traveler shown in Figs. 1 and 2. Fig. 4 is a similar section with a traveler shown in still another position. Fig. 5 is a vertical section of a part of the machine, illustrating the mechanism for revolving the main table or platform. Fig. 6 is a horizontal section on the line $x\ x$ of Fig. 5.

My invention relates to those portions of the mechanism which affect the rigidity of the travelers in machines for making cordage, &c., by uniting the strands in an interlocking twist, and is specially designed to provide an efficient and economical method of supporting said travelers when the machine is operated with a great strain upon the strands, as is particularly desirable when making a hard-braided cord. The ordinary travelers, to which are attached the strand-delivering spool-frames in such machines, are each formed of two disks united by a short cylindrical neck, and a foot projecting from the lower disk, as shown in Letters Patent of the United States No. 276,201, granted to me April 24, 1883. In operation one of these disks rests upon the guide-ring and the other fits up against its under side. This construction is objectionable, as the tension upon the strands pulls the spool-frames toward the center of the machine and produces a tendency in the travelers to which they are attached to be inclined inward. This causes great friction between the disks and the guide-ring, whereby the parts in contact are rapidly worn away, and the looseness or play thus produced allows the spool-frames to be so much inclined toward the center of the machine that their tops come into contact with each other. The machine is thus liable to be injured or broken, and its wearing parts require frequent renewal.

To overcome this difficulty by furnishing additional support to the travelers is the object of my invention, which consists in the combination, with the main table or revolving platform, of travelers, each having an elongated neck, and a single disk at each end thereof, and the customary foot-piece, a guide-ring and carrier-gears, with bearings of suitable length to extend from one end to the other of such elongated necks, and a supporting-plate placed within the guide-ring and parallel with the said main table, in such manner as to form a bearing against which the upper part of the necks of the travelers will rest when they are held stationary in the guide-ring, and which shall steady the same when they are being moved by the carrier-gears from one position to another in the guide-ring, by which construction the travelers and the spool-frames attached thereto are at all times maintained in a vertical position and the friction and wear of the parts reduced to a minimum.

In the said drawings, H is the frame of the machine, in which is secured the guide-ring F.

A is the main revolving table or platform, to which motion is transmitted through the gear K, secured to the lower end of a sleeve, S, connected with the platform and revolving around a main spindle, $k$, rising from the frame H, this spindle being preferably made hollow to permit the passage of a core or center for the cord, if such should be required. The gear K engages with a spur and bevel gear, I, which is mounted on a vertical stud, $r$, and meshes with a bevel-gear, L, on the driving-shaft M, as seen in Figs. 5 and 6, and thus as the latter is rotated the platform A is revolved as required.

G are the carrier-gears, which by the engagement of their teeth with those of the guide-ring F are revolved around the studs $g$, rising from the table A.

The machine is constructed for fifteen travelers, D, (of which one only is shown,) to which are attached spool-frames (not shown) carrying the strands which are to be united together to form a cord. These spool-frames may be of any well-known construction similar, for instance, to those shown in the United States Patent of Wm. H. Defrees, No. 153,320, dated July 21, 1874. These travelers are operated by the guide-ring F, the carrier-gears G, the switch-levers B C, and switch-springs $b$ $c$, in a manner fully set forth in my United States Patent No. 276,201, already referred to.

T is the supporting-plate, which is secured to the platform A, in a position above the same and parallel therewith, by the studs $f$, the said plate lying within the guide-ring F, and flush with the upper surface thereof, as seen in Figs. 2 and 3, and being made adjustable vertically by the nuts 25.

A small portion, $a$, of the platform A, and also a portion, $t$, of the supporting-plate T, are made removable, to allow of the insertion and withdrawal of the travelers.

The travelers D have elongated necks 33, and the guide-ring F is provided with projecting portions 34 from its under side, forming bearings in said guide-ring suitable to extend from one end to the other of the necks 33, and the carrier-gears G are provided on the under side with projecting portions 35, forming bearings also suitable to extend from one end to the other of the necks 33 of the travelers.

When a traveler, D, is in the position shown in Figs. 1 and 2, which illustrates the position which it occupies while being taken by a carrier-gear, G, from a place in the guide-ring F, or being delivered by a carrier-gear into a place of rest in the said guide-ring, the elongated neck 33 of the traveler is supported on one side by the guide-ring F and its projecting portion 34, and on the other side by the carrier-gear G and its projecting portion 35, and the upper disk of the traveler rests upon the upper surfaces of the guide-ring F and carrier-gear G, and the lower disk of the traveler fits up against the lower faces of the projecting portions 34 and 35 of the guide-ring and carrier-gear. The traveler is thus held firmly and rigidly in a vertical position, its neck 33 and the projecting portions 34 and 35 of the guide-ring and carrier-gear being made of such length as to prevent any inward inclination of the traveler or serious wear upon it, even when the pull toward the center of the machine, induced by the strain upon the strand delivered from the spool-frame attached to its upper portion, is so great that the ordinary short-necked traveler would soon be worn loose and become unsteady.

When a traveler is held in a position of rest in the guide-ring—as, for instance, if its neck is held in the tooth 70 of the guide-ring, Fig. 1—the neck 33 of the traveler, Fig. 3, is supported on the outside by the guide-ring F and its projecting portion 34, and on the inside by its upper portion resting against the plate T, and the upper disk of the traveler rests upon the upper surfaces of the plate T and the guide-ring F, and its lower disk fits up against the lower face of the projecting portion 34 of the guide-ring, the foot-piece $h$ of the traveler bearing, as usual, against a shoulder, $i$, at the outer periphery of the platform A. The traveler is thus firmly supported and held rigidly in a vertical position, and its tendency to be inclined toward the center of the machine by the pull or strain upon its strand is thus neutralized and prevented from causing it to become loose or unsteady in its position.

When a traveler is being moved around a recess, E, by a carrier-gear—as, for instance, if its neck is held in the space 80 of a carrier-gear, Fig. 1—the neck 33 of the traveler, Fig. 4, is supported by the carrier-gear G and the projecting portion 35 thereof on one side, and by its upper portion resting against the plate T on the other side, and the upper disk of the traveler rests upon the upper surfaces of the carrier-gear G and the plate T, and its lower disk fits up against the lower face of the projecting portion 35 of the carrier-gear, the foot-piece $h$ of the traveler bearing, as usual, against the edge of the recess E of the platform A. The traveler is thus held erect, and at all points in its path, whether at rest or in motion, it maintains its vertical position, and the machine may be operated with a great strain upon the strands without causing the spool-frames upon the travelers to be inclined toward each other, and without causing undue wear upon the parts in contact.

In the machine as here shown and described the lengthened bearings 34 and 35 for the elongated necks 33 are formed by projecting portions of the guide-ring and carrier-gears. It is obvious, however, that the entire guide-ring and carrier-gears might be thickened up to the degree necessary to equal the length of the necks of the travelers without departing from the spirit of my invention.

I am aware of the United States Patent of Wm. H. Defrees, No. 153,320, dated July 21, 1874; but the device therein described, having two separate and independent guide-rings and two sets of carrier-gears, involves considerable unnecessary expense, and requires careful adjustment to secure the vertical alignment of the similar parts, while the flaws incident to the casting of the travelers with two short necks and double-flanged heads occasion frequent stoppages of the machine for the renewal of broken travelers, or render necessary a heavier construction of moving parts than is desirable, and make it difficult to secure such perfect work as in the traveler herein represented, having a single elongated neck and a single disk at each end thereof. My improved traveler therefore secures an equal rigidity with a less expensive construction and less weight of material than the traveler having double-flanged heads, before mentioned.

What I claim as my invention, and desire to secure by Letters Patent, is—

The combination, with the main table or revolving platform A and means, substantially as described, for rotating the same, of travelers D, each having an elongated neck, and a single disk at each end thereof, a guide-ring, F, and carrier-gears G, with bearings of suitable length to extend from one end to the other of such elongated necks, and a supporting-plate, T, placed within the guide-ring F, and parallel with the said main table, all constructed to operate together substantially in the manner and for the purpose set forth.

Witness my hand this 29th day of November, A. D. 1884.

JAMES P. TOLMAN.

In presence of—
P. E. TESCHEMACHER,
W. J. CAMBRIDGE.